(12) United States Patent
Seidman et al.

(10) Patent No.: US 7,743,380 B2
(45) Date of Patent: Jun. 22, 2010

(54) MONITORING CLUSTERED SOFTWARE APPLICATIONS

(75) Inventors: David Isaiah Seidman, Sunnyvale, CA (US); Piotr Findeisen, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1407 days.

(21) Appl. No.: 11/040,768

(22) Filed: Jan. 21, 2005

(65) Prior Publication Data

US 2006/0167939 A1     Jul. 27, 2006

(51) Int. Cl.
G06F 9/46 (2006.01)
G06F 9/44 (2006.01)

(52) U.S. Cl. .......... 718/105; 718/104; 717/127

(58) Field of Classification Search ......... 718/104–105; 709/223–226, 217, 219; 702/186, 182; 707/102; 717/127

See application file for complete search history.

(56) References Cited

U.S. PATENT DOCUMENTS

| | | | |
|---|---|---|---|
| 5,276,877 A * | 1/1994 | Friedrich et al. | 718/105 |
| 6,003,079 A * | 12/1999 | Friedrich et al. | 709/224 |
| 6,377,907 B1 * | 4/2002 | Waclawski | 702/182 |
| 6,425,006 B1 * | 7/2002 | Chari et al. | 709/224 |
| 6,467,052 B1 * | 10/2002 | Kaler et al. | 714/39 |
| 6,609,083 B2 * | 8/2003 | Enck et al. | 702/186 |
| 6,826,575 B1 * | 11/2004 | Waclawski | 707/102 |
| 7,028,301 B2 * | 4/2006 | Ding et al. | 718/104 |
| 7,127,716 B2 * | 10/2006 | Jin et al. | 718/105 |
| 7,363,543 B2 * | 4/2008 | Peebles et al. | 714/26 |
| 7,412,513 B2 * | 8/2008 | Levanoni et al. | 709/225 |
| 7,426,731 B2 * | 9/2008 | Findeisen | 718/104 |
| 7,441,242 B2 * | 10/2008 | Barsness et al. | 718/104 |
| 7,457,864 B2 * | 11/2008 | Chambliss et al. | 709/224 |
| 2002/0138559 A1 * | 9/2002 | Ulrich et al. | 709/203 |
| 2002/0184043 A1 * | 12/2002 | Lavorgna et al. | 705/1 |
| 2003/0208460 A1 * | 11/2003 | Srikant et al. | 707/1 |

\* cited by examiner

*Primary Examiner*—Meng-Ai An
*Assistant Examiner*—Tammy Lee

(57) ABSTRACT

Embodiments of the invention distribute profiling responsibilities for a clustered application to various instances of the application that generally run on different computer hosts. In an embodiment, the profiling responsibility is measured in terms of metrics wherein each profiling agent of an instance collects metrics about that instance. The metrics are prioritized and assigned to instances such that the highest priority metrics are assigned if possible. Each metric is associated with an expected performance overhead, and the assignment of metrics to an instance is done such that the performance overhead on that instance and/or host does not exceed a threshold. Other embodiments are also disclosed.

15 Claims, 1 Drawing Sheet

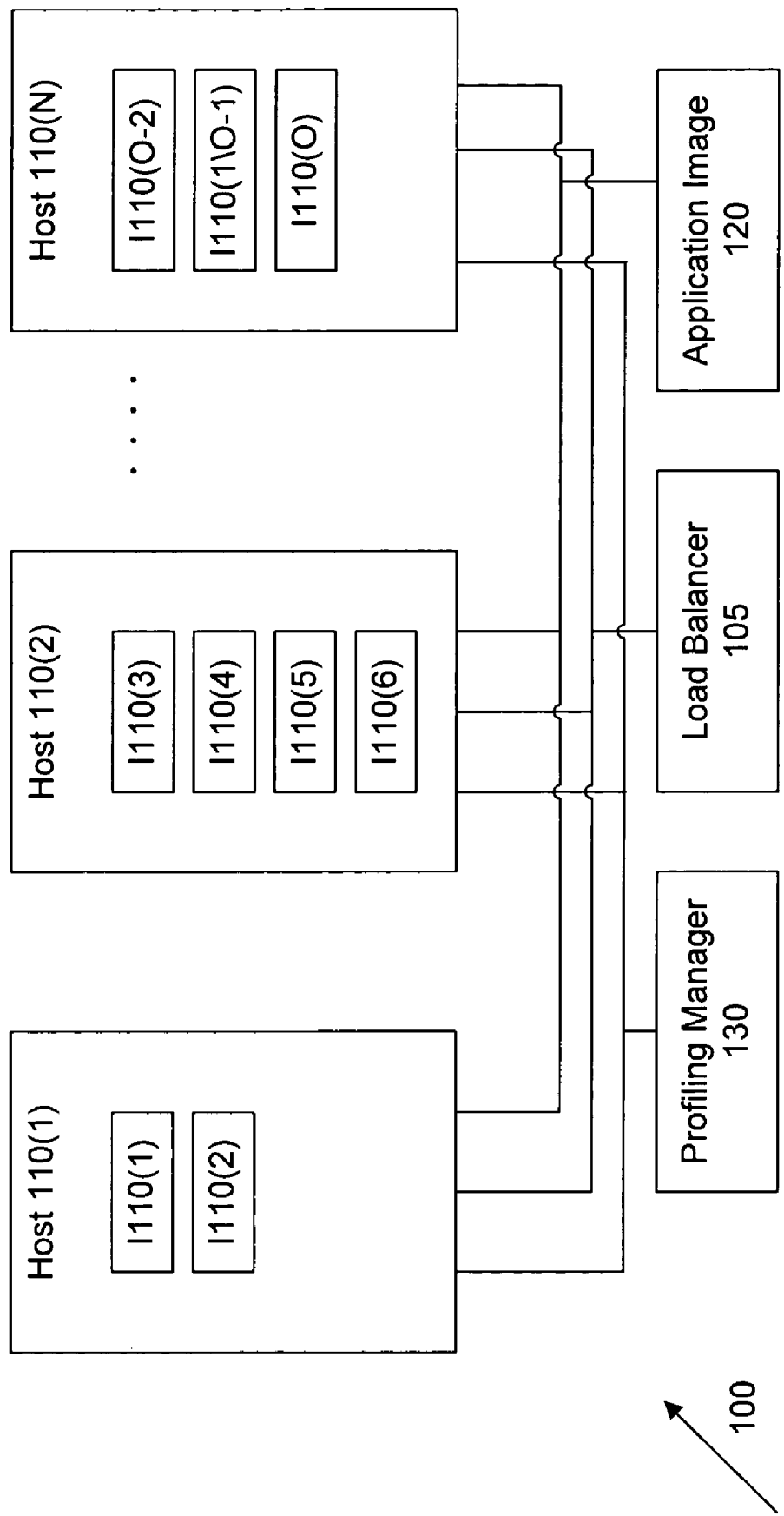

MONITORING CLUSTERED SOFTWARE APPLICATIONS

FIELD OF THE INVENTION

The present invention relates generally to monitoring clustered software applications.

BACKGROUND OF THE INVENTION

Computer software applications are increasingly designed to run in clusters, i.e., to run as multiple replicated instances on possibly multiple computer systems, which, for illustration purposes, may be referred to as "hosts." Advantages of clustered applications include scalability, robustness, and economy. Scalability refers to the fact that the application can easily expand its computing capacity, and robustness refers to difficulty for the entire application to fail. For example, if one instance of the application crashes, or even if an entire host containing several instances crashes, the other instances and hosts can continue to function. Clustered applications are economical because they are frequently deployed on many inexpensive computers, yet can provide as much computing power as one large, much more expensive computer.

However, the presence of many application instances on many hosts makes monitoring and management of these applications significantly more difficult. Monitoring the health of the applications in a live production environment and managing their behavior can become expensive and inefficient. Further, current monitoring and management solutions generally do not provide in-depth profiling information about applications. Even when they do, detailed profiling is computationally expensive, and can degrade application and/or system performance. Therefore, in-depth profiling information is usually not collected in deployment environments. To keep performance acceptable, deployment-time monitoring is used to provide coarse, general information about application behavior. However, information provided to the user is usually of limited use because such information normally does not provide enough detail to indicate the root cause of an application problem.

SUMMARY OF THE INVENTION

Embodiments of the invention distribute profiling responsibilities for a clustered application to various instances of the application that generally run on different computer hosts. In an embodiment, the profiling responsibility is measured in terms of metrics wherein each profiling agent of an instance collects metrics about that instance. The metrics are prioritized and assigned to instances such that the highest priority metrics are assigned if possible. Each metric is associated with an expected performance overhead, and the assignment of metrics to an instance is done such that the performance overhead on that instance and/or host does not exceed a threshold.

An exemplary method embodiment includes two loops, one outer loop and one inner loop. The outer loop loops over the metrics, e.g., M(1) to M(P), in decreasing order of priority. The inner loop loops over the instances, e.g., I(1) to I(O), also in decreasing order of priority. While in the loops, if a metric, e.g., metric M(J), may be assigned to an instance, e.g., instance I(K), then that metric M(J) is assigned to that instance I(K), and the next metric, e.g., metric M(J+1) is selected until all metrics M in the outer loop are evaluated for assignment. However, if metric M(J) cannot be assigned to instance I(K), then the method proceeds through the list of instances, e.g., instance I(K+1), I(K+2), etc., until metric M(J) may be assigned to an instance, e.g., instance I(K+L). If metric M(J) is assigned, then the next metric, e.g., metric M(J+1), is selected until all metrics M are evaluated for assignment. If metric M(J) cannot be assigned to any instance, then that metric M(J) is skipped, i.e., measurement for that metric is not performed. A metric M may be assigned to an instance if the total overhead of all metric(s) that has been assigned to that instance plus the overhead of the metric to be assigned to the same instance does not exceed an overhead threshold. Other embodiments are also disclosed.

BRIEF DESCRIPTION OF THE DRAWINGS

The present invention is illustrated by way of example, and not by way of limitation, in the FIGURE of the accompanying drawings in which like reference numerals refer to similar elements and in which:

FIG. 1 shows an arrangement upon which embodiments of the invention may be implemented.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Embodiments of the invention distribute profiling responsibilities across replicated instances of a clustered application. Because each instance is a clone of other instances in the cluster, a metric may be assigned to one instance, and insight into the behavior of the entire application may still be achieved. Embodiments may collect profiling information for multiple applications at the same time.

FIG. 1 shows an arrangement 100 upon which embodiments of the invention may be implemented. Arrangement 100 includes a load balancer 105, a plurality of hosts, e.g., hosts 110(1) to 110(N), a program application image 120, and a profiling manager 130. Load balancer 105 distributes workloads, delegates responsibilities, etc., to hosts 110 and/or instances I110. Each host 110 runs one or a plurality of instances I110, e.g., I110(1) to I110(O) of an application, e.g., application 120. In the example of FIG. 1, host 110(1), 110(2), and 110(N), runs instances I110(1) and I110(2), instances I110(3)-I110(6), and I110(O-2) to I110(O), respectively. An instance I110 includes a profiling agent and an interface (not shown) that provides access to the instance and/or application 120. The profiling agent collects profiling information or metrics about each instance. Generally, the profiling agent hooks into the profiling interface so that the profiling agent, via the interface, accesses the application and/or the Java Virtual Machine that runs a Java application to obtain the data. Depending on implementations, the profiling agent may have a communication layer that enables it to communicate with other elements, e.g., the profiling manager 130. Usually, there is interaction between the profiling agent and profiling manager 130 for the profiling manager to know the capability of the profiling agent. The profiling agent, under the direction of the profiling manager and via the profiling interface, performs appropriate actions including collecting data. The agent acquires the data, via the interface, and sends the data to the profiling manager, which, in turn, provides the data to the user.

The profiling interface is means for interfacing with an application, e.g., for collecting data inside an instance. Depending on implementation, each instance includes a plug-in and a shared library that execute with the application and use the interface to access the application and acquire data, e.g., collected metrics. Publicly available interfaces include the Java Virtual Machine Profiler Interface (JVMPI), the Java Virtual Machine Tool Interface (JVMTI), the Java Management Extension (JMX), etc. Both the JVMPI and JVMTI run on the Java platform and provide ways to create an in-process agent to collect/monitor data from Java applications. In effect, in the Java environment, the profiling interface is a way for the profiling agent to plug into a Java application, e.g., application 120, and to request application events, to call functions in the application, and to acquire data from the application, etc. Further, the application instances run on top of the Java Virtual Machine. In an embodiment, application 120 starts the profiling agent and provides a flag identifying the application, e.g., providing the name of the application, so that instances of an application may be identified as instances of that particular application. Alternatively, profiling manager 130 automatically determines the application name. Additionally, an instance I110 can be started with an option that specifies the name of a profiling agent and the name of the application itself.

Profiling manager 130 is responsible for determining which instances are deployed in appropriate hosts 110, and is provided with information related to the hosts, applications, and instances of applications running on a particular host, etc. Profiling manager 130 can determine the existence of different applications such as application 120, and assign responsibilities to each instance. Profiling manager 130 enables the instances to maximize profiling coverage with minimum overhead. Profiling manager 130 can activate profiling on the hosts and instances, and communicate with these hosts and instances to collect and display data.

Metric Overhead

Exemplary profiling information of an application includes compiled methods, application thread states, CPU time per method, thread deadlock detection, the number of loaded classes, the number of allocated objects, garbage collection, thrown exceptions, etc. Generally, the profiling agent of an instance is provided with a known collection of metrics it can collect about the instance. Each metric is associated with a performance overhead, and profiling of an application is allowed only if the performance overhead is below a threshold because, for example, if the overhead is above the threshold, then degradation of system performance is not acceptable. Generally, a user selects a maximum acceptable overhead, e.g., 5%, 10%, 15%, etc., of system performance based on business decision, e.g., whether this threshold is acceptable for system performance in accordance with users' desire, interest, etc. For illustration purposes, the overhead threshold is referred to as threshold T, and, may be selected by a user, for example, at 10%, which then would exclude any metric resulting in total overhead greater than 10%. Since the threshold T is selected based the user's discretion, it is flexible. The threshold T can be provided to the system, the profiling agent, etc., through a graphical user interface.

Overhead of a metric is generally obtained experimentally, such as measuring system load/performance with an application that run with and without the metric. For example, if system performance without collecting the metric takes 10 seconds while system performance with the metric being collected takes 11 seconds, then the overhead of that metric is 1 second or 10%.

In general, the overhead of two metrics assigned to the same instance is not necessarily the sum of the overheads of two metrics. It may be less if implementation details allow a metric to be collected easily once a similar metric is already assigned. The profiling agent can establish the expected overhead of a given set of metrics. Before a metric is assigned to an instance, the total overhead that that instance may be handling is compared against the threshold T to determine whether such assignment is acceptable. That is, to determine whether the total overhead of metric(s) already assigned to that instance plus the overhead for the metric to be assigned to the same instance is less than (or equal to, depending on implementation) the overhead threshold T.

Generally, instances are assigned different metrics, and profiling information from different instances may not be the same. Each metric may be prioritized by the user in order of importance, interests, business decision, etc. For example, the metric of thrown exceptions is of greater interest or having higher priority than time spent in garbage collection, which, in turn, has higher priority than determining the number of allocated registers, etc. For illustration purposes, if there are P metrics, then these P metrics are referred to as metric M(1) to M(P) wherein M(1) has higher priority then M(2); M(2) has higher priority than M(3); . . . ; M(P−1) has higher priority than M(P). Since the metrics are prioritized, embodiments of the invention, when desired, ensure that metrics with the highest priorities are assigned and thus information related to such metrics may be collected. Depending on implementation, a metric may be assigned to multiple instances.

Automatic Assignment in a Method Embodiment

Assigning metrics to instances may be done automatically based on a method or algorithm. An exemplary method embodiment includes two loops, an outer loop and an inner loop. The outer loop iterates over the metrics in a predefined order of priority, e.g., M(1) to M(P). The inner loop iterates over the application instances, e.g., I(1) to I(O), also in a predefined order of priority. Exemplary orders include from highest to lowest priority, from the longest time to shortest time it takes to execute the metric, etc. In effect, for each metric, the method loops over the instances, and if a metric, e.g., metric M(J) may be assigned to an instance, e.g., instance I(K); that is, the total overhead of all metric(s) plus the overhead of the metric M(J) to be assigned to instance I(K) does not exceed an overhead threshold of the instance I(K), then that metric M(J) is assigned to that instance I(K), and the next metric, e.g., metric M(J+1) is selected until all metrics M(1) to M(P) are evaluated for assignment. However, if metric M(J) cannot be assigned to instance I(K), i.e., the total overhead of all metric(s) plus the overhead of the metric M(J) to be assigned to instance I(K) exceeds the overhead threshold allowable for instance I(K), then the method proceeds down the list of instances, e.g., instance I(K+1), I(K+2), etc., until an instance, e.g., instance I(K+L) may accept metric M(J). At this time, metric M(J) is assigned, and the next metric, e.g., metric M(J+1) is selected until all metrics M(1) to M(N) are evaluated for assignment. If metric M(J) cannot be assigned to an instance, then that metric M(J) is skipped, i.e., is not assigned to any instance.

Graphical User Interface

Embodiments of the invention include a user interface from which a user can use the "drag and drop" techniques known by those skilled in the art, to assign metrics to instances. The user interface shows the list of applications with corresponding metrics and overhead for each of the metrics, the available instances, the metrics that have/have not been assigned to a particular instance, the instances in corresponding hosts, etc. Each metric is displayed with instances associated with an application. Further, the user interface provides one view of the whole application, instead of showing each instance separately.

To assign metrics to an instance, e.g., instance I(1), the user clicks on that instance to select it. The user then selects the metrics to be assigned and clicks on the "assign" button for the assignment to occur. Once a metric is dropped in an instance, the overall overhead that that instance is handling may be calculated. Since related metrics if assigned to an instance can reduce the total overhead, the user interface highlights related metrics to inform the user so that they can assign related metrics to the same instance if desired. Examples of pairs of related metrics include "thread state histogram" and "thread lock contention," and "heap graph" and "garbage collections statistics." Even if a metric has been assigned to an instance, that metric may be assigned to another instance or placed in the lists of metric to be assigned. If assigning a metric to an instance causes the total overhead for that instance to exceed the threshold, the user is notified, e.g., by a flag, a buzz, etc. The user has the option to readjust the threshold.

The user interface allows the user to display the metric, for example, the heap size, CPU utilization, etc., as a function of time, etc. The user may select one or more applications of a list of applications to work on. The user interface can show all the instances to which a metric has been assigned. Two different instances may have the different results for the same metric, the user interface, e.g., by a graph on display, can show the results for each instance, the difference between the results, etc. Reasons for instances not to provide the same results include the speed of the host running the instance. The application instances can be listed and made available on user's demand, and can include instance properties.

Variations

Depending on implementations, embodiments of the invention vary from the illustrative embodiments. For example, in the above two outer and inner loops, there is no priority for the metrics and/or the instances. That is, a metric in the list of metrics and/or instance in the list of instances may be selected randomly. An instance may be assigned as many metrics as possible. Performance overhead may be based on CPU utilization, transaction throughput, transaction response time, memory footprint, etc. Further, different thresholds to instances on different hosts or a cumulative threshold for the application may be applied. Instead of using performance overhead as a threshold, other types of threshold may be used, including, for example, a maximum number of metrics assigned to an instance, optimizing overhead per host, etc. In a very long list of available metrics, e.g., 1000 metrics, only a limited number, e.g., 100, of metrics are assigned.

In the embodiment of FIG. 1, a host may run a plurality of instances. However, other embodiments may be applicable in case of one instance, and the invention is not limited to the number of instances of an application that run on a host. Further, embodiments of the invention are also applicable in the dynamic creation and destruction of instances. For example, when an instance ceases to exist, the metrics assigned to this instance are "freed." That is, these metrics are included in the list of metrics to be (re)assigned. If the metrics are prioritized in a list, then the freed metric is placed at its appropriate prioritized order. When an instance is created, it is added to the list of instances, and, again, if the instances are prioritized, then the created instance is placed at its appropriate prioritized order. There are various ways to prioritize instances, and a user may prioritize instances based on his interests. For example, instances running or larger system, e.g., system with more than 4 CPU, have higher priority than those running on smaller systems; instances running by themselves have higher priority than those running with other instances, etc.

Computer

A computer may be used as a host 110, to run program application 120, to run the user interface, to assign metrics to instances, to perform embodiments in accordance with the techniques described in this document, etc. For example, a CPU (Central Processing Unit) of the computer executes program instructions implementing the method embodiments by loading the program from a CD-ROM to RAM and executes those instructions from RAM. The program may be software, firmware, or a combination of software and firmware. In alternative embodiments, hard-wire circuitry may be used in place of or in combination with program instructions to implement the described techniques. Consequently, embodiments of the invention are not limited to any one or a combination of software, firmware, hardware, or circuitry.

Instructions executed by the computer may be stored in and/or carried through one or more computer readable-media from which a computer reads information. Computer-readable media may be magnetic medium such as, a floppy disk, a hard disk, a zip-drive cartridge, etc.; optical medium such as a CD-ROM. a CD-RAM, etc.; memory chips, such as RAM, ROM, EPROM, BEPROM etc. cables, copper wire, fiber optics, acoustic, electromagnetic waves, capacitive or inductive coupling, etc.

Advantages of Embodiments of the Invention

Embodiments of the invention are advantageous over other approaches. Embodiments of the invention can be used independent of host CPU and operating system, application programming language and model, and profiling interfaces. Embodiments scale very well because the more instances exist in a system, the more metrics may be assigned to the application, and fewer metrics may be assigned to each instance. In fact, the efficacy of the embodiments improves as the number of instances increases. Since each instance is partly responsible for providing the information, system performance is not degraded while information from the many instances may be aggregated and provide detailed profiling information of the application. As a result, embodiments of the invention assign a metric to an instance of an application, but can still get insight into the entire application. Further, since information related to a metric is collected from an instance, the metric represents behavior of the application because the instances are replicated.

In the foregoing specification, the invention has been described with reference to specific embodiments thereof.

However, it will be evident that various modifications and changes may be made thereto without departing from the broader spirit and scope of the invention. Accordingly, the specification and drawings are to be regarded as illustrative rather than as restrictive.

What is claimed is:

1. A method for distributing profiling responsibilities for an application having a plurality of instances, comprising:
   identifying a plurality of computers that run corresponding instances of the application;
   providing a plurality of profiling metrics each of which is associated with a corresponding overhead;
   assigning, by a processor, a first one of the profiling metrics associated with a first overhead to a particular one of the instances, wherein the assigning comprises:
      if no profiling metric has been assigned to the particular instance, then the assigning is based on comparing a threshold to the first overhead to determine if the first overhead exceeds the threshold,
      else if at least one second profiling metric has been assigned to the particular instance, then the assigning is based on comparing the threshold to a second overhead that is an aggregate of the first overhead and a third overhead associated with the at least one second profiling metric that has been assigned to the particular instance, wherein comparing the threshold to the second overhead is to determine whether the second overhead exceeds the threshold,
   wherein assigning the first profiling metric to the particular instance causes data of the first profiling metric to be collected for the particular instance.

2. The method of claim 1 wherein the plurality of profiling metrics are prioritized for assigning purposes, or the plurality of instances are prioritized for assigning purposes, or both the plurality of profiling metrics and plurality of instances are prioritized for assigning purposes.

3. The method of claim 1 wherein the threshold is selected from one or a combination of performance of the particular instance and performance of a computer running the particular instance.

4. The method of claim 3 wherein the performance of the particular instance or of the computer running the particular instance is based on one or a combination of CPU utilization, transaction throughput, transaction response time, and memory footprint.

5. The method of claim 1 further comprising, wherein when the particular instance ceases to exist, reassigning any of the profiling metrics assigned to the particular instance.

6. The method of claim 1 further comprising, wherein when a new instance of the application comes into existence, assigning one or more of the profiling metrics to the new instance.

7. The method of claim 1 further comprising using drag and drop techniques in conjunction with a user interface to assign a profiling metric to an instance.

8. A method for distributing profiling responsibilities for an application having a plurality of instances, comprising:
   identifying a plurality of computers running corresponding instances of the application;
   assigning a plurality of metrics to the plurality of instances based on at least a predefined order of priority of the plurality of metrics and a predefined order of priority of the plurality of instances; and
   using a threshold to determine whether to assign a particular one of the metrics to a particular one of the instances, comprising:
      if no metric has been assigned to the particular instance, then the assigning is based on determining whether a first overhead associated with the particular metric exceeds the threshold; and
      else if at least one second metric has been assigned to the particular instance, then the assigning is based on determining whether a second overhead exceeds the threshold, wherein the second overhead is an aggregate of the first overhead and a third overhead associated with the at least one second metric.

9. The method of claim 8 wherein the threshold is selected based on one or a combination of performance of the particular instance, performance of a computer running the particular instance, and a number of metrics assigned to the particular instance.

10. The method of claim 8, wherein assigning based on at least the predefined order of priority of the plurality of metrics and the predefined order of priority of the plurality of instances comprises:
    iteratively selecting a metric from among the plurality of metrics to assign using the predefined order of priority of the plurality of metrics, and
    for the selected metric, iteratively selecting an instance from among the plurality of instances to assign the selected metric, wherein selecting the instance is based on the predefined order of priority of the plurality of instances.

11. A computer-readable storage medium embodying computer-executable instructions that upon execution in a computer performs a method for assigning metrics to instances of a program, the method comprising:
    using a first loop iterating over the metrics in an order of metric priority;
    using a second loop iterating over the instances in an order of instance priority; and
    wherein in attempting to assign, using the first loop and the second loop, a particular one of the metrics to a particular one of the instances:
       if the particular metric is unable to be assigned to the particular instance based on determining that a first overhead exceeds a threshold, then selecting another instance to assign the particular metric, wherein the first overhead is an aggregate of an overhead associated with the particular metric and an overhead associated with at least another metric already assigned to the particular instance;
       else if the particular metric is successfully assigned to the particular instance, then selecting another metric for assigning.

12. The computer-readable storage medium of claim 11, wherein assigning the particular metric to the particular instance comprises:
    if no metric has been assigned to the particular instance, then assigning is based on determining whether the overhead associated with the particular metric exceeds the threshold,
    else, if at least one second metric has been assigned to the particular instance, then assigning is based on determining whether first overhead exceeds the threshold, the first overhead being an aggregate of the overhead associated with the particular metric and the overhead associated with the at least one second metric.

13. A system comprising:
    a processor;

a user interface for use in assigning a plurality of metrics to a plurality of first instances of a program, wherein the metrics are each associated with a corresponding overhead;

the user interface includes computer-executable instructions executable on the processor for displaying the plurality of metrics;

wherein the user interface is configured to receive user-performed drag and drop operations to assign metrics to the first instances; and wherein the processor is configured to assign a first of the plurality of metrics associated with a first overhead to a particular one of the first instances based on a threshold related to the particular first instance, wherein the assigning comprises:

if no metric has been assigned to the particular first instance, then the assigning is based on determining whether the first overhead exceeds the threshold; and else if at least one second metric has been assigned to the particular first instance, then the assigning is based on determining whether a second overhead exceeds the threshold, wherein the second overhead is an aggregate of the first overhead and a third overhead associated with the at least one second metric.

14. The system of claim 13 wherein the computer-executable instructions are executable on the processor to further display one of a combination of a plurality of second instances of a second program, a graph of a metric, an instance having no metric assigned to it, an instance having at least a metric assigned to it, properties of an instance, metrics that have been assigned to at least an instance, and metrics to be assigned to an instance.

15. The system of claim 13 wherein the computer-executable instructions are executable to further allow the threshold to be adjusted.

* * * * *

UNITED STATES PATENT AND TRADEMARK OFFICE
CERTIFICATE OF CORRECTION

| | | |
|---|---|---|
| PATENT NO. | : 7,743,380 B2 | Page 1 of 1 |
| APPLICATION NO. | : 11/040768 | |
| DATED | : June 22, 2010 | |
| INVENTOR(S) | : David Isaiah Seidman et al. | |

It is certified that error appears in the above-identified patent and that said Letters Patent is hereby corrected as shown below:

In column 6, line 41-44, delete "a CD-ROM. a CD-RAM, etc.; memory chips, such as RAM, ROM, EPROM, BEPROM etc. cables, copper wire, fiber optics, acoustic, electromagnetic waves, capacitive or inductive coupling, etc." and
insert -- a CD-ROM, a CD-RAM, etc.; memory chips, such as RAM, ROM, EPROM, EEPROM, etc. --, therefor.

In column 8, line 62, in Claim 12, after "whether" insert -- the --.

Signed and Sealed this
Twenty-eighth Day of December, 2010

David J. Kappos
*Director of the United States Patent and Trademark Office*